(12) United States Patent
Hirosawa

(10) Patent No.: US 12,386,182 B2
(45) Date of Patent: Aug. 12, 2025

(54) DISPLAY DEVICE THAT CAN SUPPRESS DEGRADATION OF DISPLAY QUALITY

(71) Applicant: Japan Display Inc., Tokyo (JP)

(72) Inventor: Jin Hirosawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 162 days.

(21) Appl. No.: 18/460,936

(22) Filed: Sep. 5, 2023

(65) Prior Publication Data

US 2024/0077730 A1    Mar. 7, 2024

(30) Foreign Application Priority Data

Sep. 5, 2022   (JP) .................................. 2022-140755

(51) Int. Cl.
| | |
|---|---|
| *G02B 27/01* | (2006.01) |
| *G02F 1/1335* | (2006.01) |
| *G02F 1/13357* | (2006.01) |
| *G02F 1/13363* | (2006.01) |

(52) U.S. Cl.
CPC ... *G02B 27/0172* (2013.01); *G02F 1/133526* (2013.01); *G02F 1/133541* (2021.01); *G02F 1/133603* (2013.01); *G02F 1/133638* (2021.01); *G02B 2027/0174* (2013.01)

(58) Field of Classification Search
CPC ........ G02B 27/0172; G02B 2027/0174; G02F 1/133526; G02F 1/133541; G02F 1/133603; G02F 1/133638
See application file for complete search history.

(56) References Cited

U.S. PATENT DOCUMENTS

| | | | |
|---|---|---|---|
| 6,421,183 B1 | 7/2002 | Ophey | |
| 2001/0028332 A1 | 10/2001 | Roest | |
| 2016/0353092 A1* | 12/2016 | Bruder | .................. H04N 13/32 |
| 2018/0180889 A1 | 6/2018 | Lee et al. | |
| 2019/0079234 A1 | 3/2019 | Takagi et al. | |
| 2019/0265493 A1 | 8/2019 | Takagi et al. | |
| 2019/0265494 A1 | 8/2019 | Takagi et al. | |
| 2020/0209453 A1* | 7/2020 | Kwon | .................. G02B 5/3083 |
| 2021/0199870 A1* | 7/2021 | Ko | ........................ G02B 5/3016 |
| 2022/0113460 A1* | 4/2022 | Komura | ............... G02B 5/3016 |
| 2022/0113595 A1* | 4/2022 | Komura | ............ G02B 27/0172 |

(Continued)

FOREIGN PATENT DOCUMENTS

| | | | |
|---|---|---|---|
| JP | 2003504663 A | 2/2003 | |
| JP | 2003529795 A | 10/2003 | |

(Continued)

*Primary Examiner* — Tracie Y Green
(74) *Attorney, Agent, or Firm* — Maier & Maier, PLLC

(57) ABSTRACT

According to one embodiment, a display device includes a display panel, a first holographic optical element, a second holographic optical element, a polarizer transmitting first linearly polarized light and absorbing second linearly polarized light orthogonal to the first linearly polarized light, a lens element having a lens action of condensing first circularly polarized light of light transmitted through the second holographic optical element, a first retardation film located between the first holographic optical element and the second holographic optical element, a second retardation film located between the polarizer and the lens element, and a third retardation film located between the second holographic optical element and the polarizer.

20 Claims, 9 Drawing Sheets

(56) References Cited

U.S. PATENT DOCUMENTS

| | | | |
|---|---|---|---|
| 2022/0317627 A1* | 10/2022 | Wang | G09G 3/001 |
| 2024/0012249 A1* | 1/2024 | Kijima | G02B 5/3083 |
| 2024/0310634 A1* | 9/2024 | Takahashi | G02F 1/133638 |

FOREIGN PATENT DOCUMENTS

| | | | |
|---|---|---|---|
| JP | 2018106160 A | 7/2018 | |
| JP | 2019053152 A | 4/2019 | |
| JP | 2019148626 A | 9/2019 | |
| JP | 2019148627 A | 9/2019 | |

* cited by examiner

DISPLAY DEVICE THAT CAN SUPPRESS DEGRADATION OF DISPLAY QUALITY

CROSS-REFERENCE TO RELATED APPLICATIONS

This application is based upon and claims the benefit of priority from Japanese Patent Application No. 2022-140755, filed Sep. 5, 2022, the entire contents of which are incorporated herein by reference.

FIELD

Embodiments described herein relate generally to a display device.

BACKGROUND

In recent years, a technique for providing, for example, virtual reality (VR), using a head-mounted display worn on a user's head has attracted attention. The head-mounted display is configured to display an image on a display provided in front of the user's eyes. This allows the user wearing the head-mounted display to experience a virtual reality space with a sense of reality.

DETAILED DESCRIPTION

Figure 1:
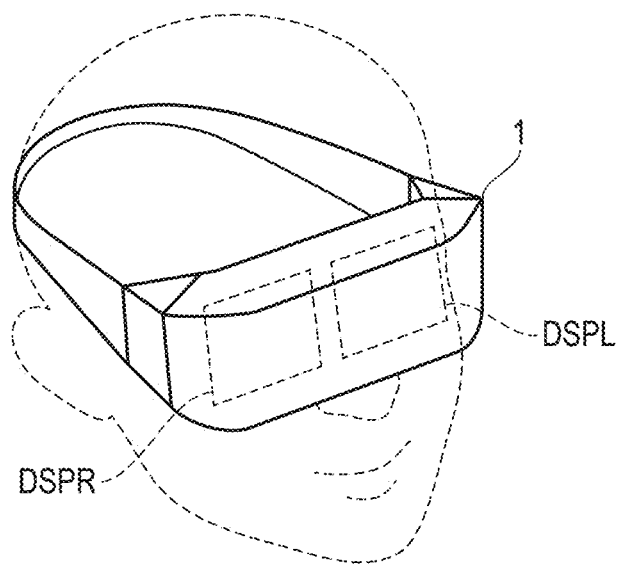
FIG. 1 is a perspective view showing an example of the appearance of a head-mounted display 1 to which a display device of an embodiment is applied.

Embodiments described herein aim to provide a display device which can suppress degradation in display quality.

In general, according to one embodiment, a display device comprises a display panel configured to emit linearly polarized display light; a first holographic optical element opposed to the display panel; a second holographic optical element opposed to the first holographic optical element; a polarizer opposed to the second holographic optical element, transmitting first linearly polarized light, and absorbing second linearly polarized light orthogonal to the first linearly polarized light; a lens element opposed to the polarizer and having a lens action of condensing first circularly polarized light of light transmitted through the second holographic optical element; a first retardation film located between the first holographic optical element and the second holographic optical element; a second retardation film located between the polarizer and the lens element; and a third retardation film located between the second holographic optical element and the polarizer.

According to another embodiment, a display device comprises: a display panel configured to emit linearly polarized display light; a first holographic optical element opposed to the display panel; a second holographic optical element opposed to the first holographic optical element; a polarizer opposed to the second holographic optical element, transmitting first linearly polarized light, and absorbing second linearly polarized light orthogonal to the first linearly polarized light; a lens element opposed to the polarizer and having a lens action of condensing first circularly polarized light of light transmitted through the second holographic optical element; a first retardation film located between the first holographic optical element and the second holographic optical element; a second retardation film located between the polarizer and the lens element; and a third retardation film located between the display panel and the first holographic optical element.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that, in order to make the descriptions more easily understandable, some of the drawings illustrate an X axis, a Y axis and a Z axis orthogonal to each other. A direction along the X axis is referred to as a first direction X, a direction along the Y axis is referred to as a second direction Y and a direction along the Z axis is referred to as a third direction Z. A plane defined by the X axis and the Y axis is referred to as an X-Y plane, and viewing toward the X-Y plane is referred to as plan view.

FIG. 1 is a perspective view showing an example of the appearance of a head-mounted display 1 to which a display device of a present embodiment is applied.

The head-mounted display 1 comprises, for example, a display device DSPR for a right eye and a display device DSPL for a left eye. The display device DSPR is located in front of the user's right eye and the display device DSPL is located in front of the user's left eye when the user is wearing the head-mounted display 1 on the head.

Figure 2:
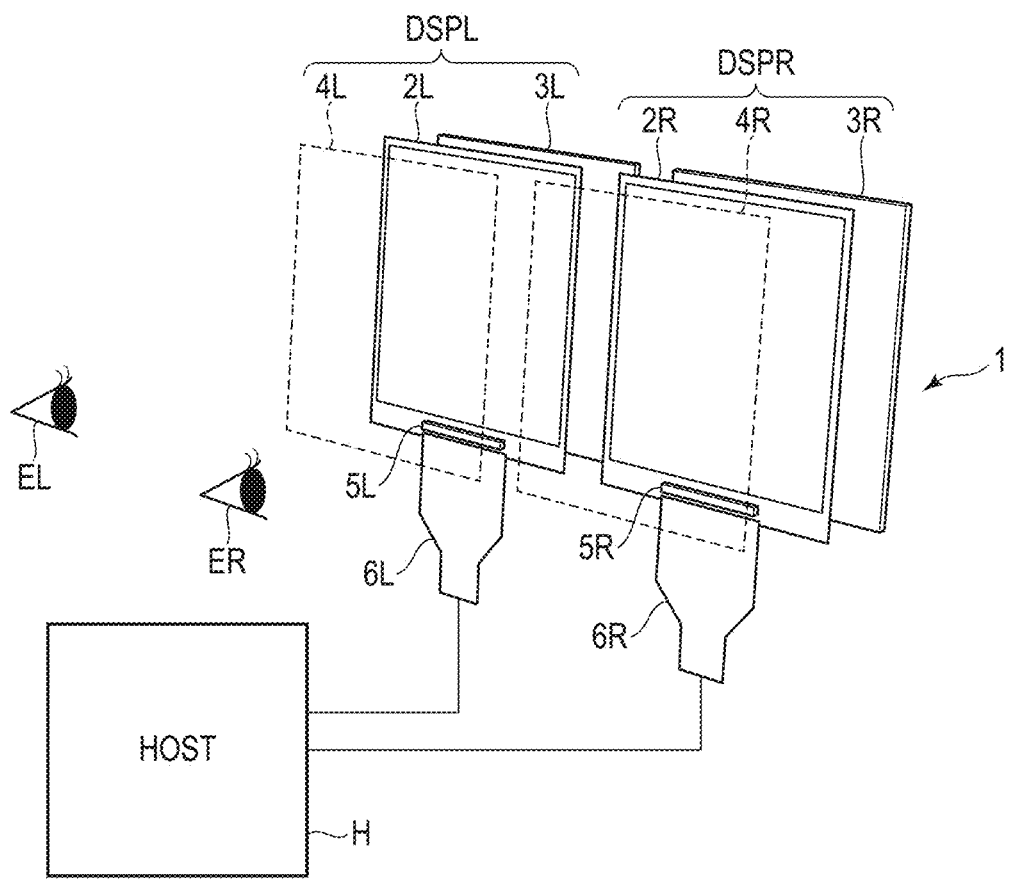
FIG. 2 is a diagram for explaining a summary of the configuration of the head-mounted display 1 shown in FIG. 1.

FIG. 2 is a diagram for explaining a summary of the configuration of the head-mounted display 1 shown in FIG. 1.

The display device DSPR comprises a display panel 2R, an illumination device 3R, and an optical system 4R represented by a broken line. The illumination device 3R is disposed on the back surface of the display panel 2R and is configured to illuminate the display panel 2R. The optical system 4R is disposed on the front surface of the display panel 2R (or between the user's right eye ER and the display panel 2R) and is configured to guide display light from the display panel 2R to the right eye ER.

The display panel 2R includes, for example, a liquid crystal panel and a polarizer. The display panel 2R is disposed between the illumination device 3R and the optical system 4R. For example, a driver IC chip 5R and a flexible printed circuit board 6R are connected to the display panel 2R. The driver IC chip 5R controls the drive of the display panel 2R (particularly, controls the display operation of the display panel 2R).

The display device DSPL comprises a display panel 2L, an illumination device 3L, and an optical system 4L represented by a broken line. The illumination device 3L is disposed on the back surface of the display panel 2L and is configured to illuminate the display panel 2L. The optical system 4L is disposed on the front surface of the display panel 2L (or between the user's left eye EL and the display panel 2L) and is configured to guide display light from the display panel 2L to the left eye EL.

The display panel 2L includes, for example, a liquid crystal panel and a polarizer. The display panel 2L is disposed between the illumination device 3L and the optical system 4L. For example, a driver IC chip 5L and a flexible printed circuit board 6L are connected to the display panel 2L. The driver IC chip 5L controls the drive of the display panel 2L (particularly, controls the display operation of the display panel 2L).

The display device DSPL is configured substantially in the same way as the display device DSPR.

That is, the display panel 2R, the illumination device 3R, and the optical system 4R, which constitute the display device DSPR, are configured in the same way as the display panel 2L, the illumination device 3L, and the optical system 4L, which constitute the display device DSPL, respectively.

In a display device DSP of the present embodiment, the display panels 2R and 2L are not limited to examples including liquid crystal panels, but may include display panels comprising self-luminous light-emitting elements such as organic electroluminescent (EL) elements, micro-LEDs, or mini-LEDs. If the display panels 2R and 2L are display panels comprising light-emitting elements, the illumination devices 3R and 3L are omitted. The display panels 2R and 2L are configured to emit linearly polarized display light and include polarizers as necessary, which will be described in detail later.

A host computer H provided outside is connected to each of the display panels 2L and 2R. The host computer H outputs image data corresponding to images displayed on the display panels 2L and 2R. The image displayed on the display panel 2L is an image for the left eye (or an image that is visually recognized by the user's left eye EL). In addition, the image displayed on the display panel 2R is an image for the right eye (or an image that is visually recognized by the user's right eye ER).

For example, when the head-mounted display 1 is used for VR, the image for the left eye and the image for the right eye are images similar to each other, which reproduce the parallax of both eyes. When the image for the left eye displayed on the display panel 2L is visually recognized by the user's left eye EL and the image for the right eye displayed on the display panel 2R is visually recognized by the user's right eye ER, the user can grasp a stereoscopic space (three-dimensional space) as a virtual reality space.

Note that the display panels 2R and 2L may be formed as a single display panel which extends from the area in front of the left eye EL to the area in front of the right eye ER. In addition, the illumination devices 3R and 3L may be formed as a single illumination device which extends from the area in front of the left eye EL to the area in front of the right eye ER.

Several configuration examples of the display device DSP of the present embodiment will be described next.

CONFIGURATION EXAMPLE 1

Figure 3:
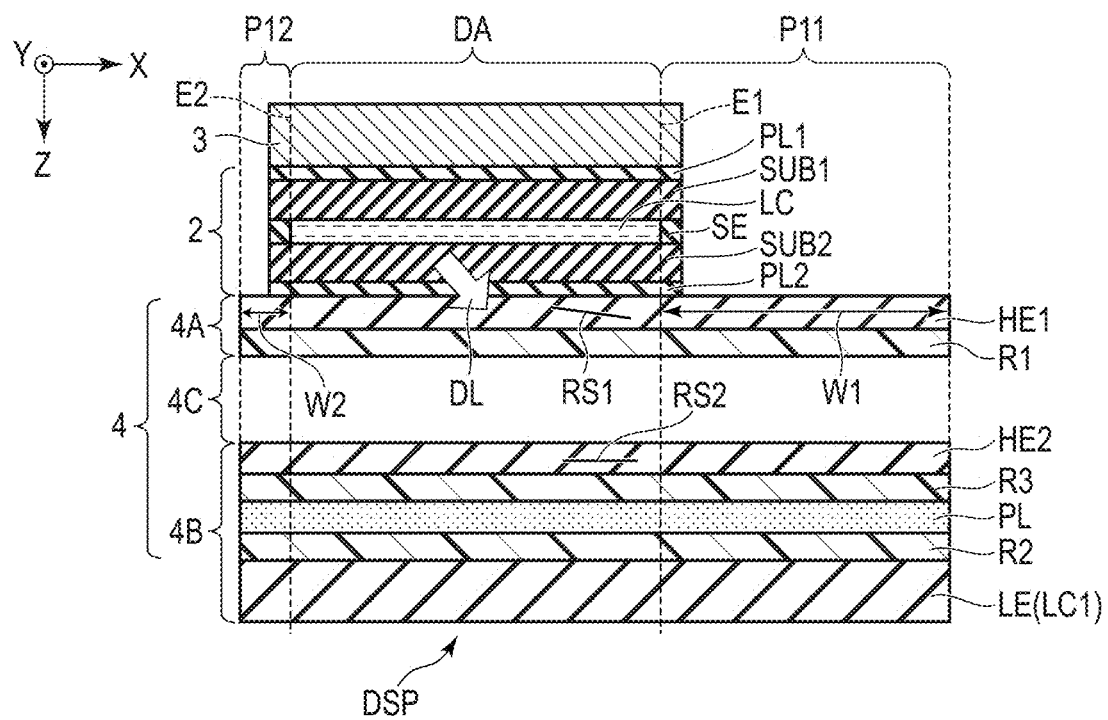
FIG. 3 is a cross-sectional view showing Configuration Example 1 of a display device DSP.

FIG. 3 is a cross-sectional view showing Configuration Example 1 of the display device DSP.

The display device DSP comprises a display panel 2, an illumination device 3, and an optical system 4. Here, the detailed illustration of the display panel 2 and the illumination device 3 is omitted from the figure. The display device DSP described here can be applied to each of the above-described display devices DSPR and DSPL. In addition, the display panel 2 can be applied to each of the above-described display panels 2R and 2L. Moreover, the illumination device 3 can be applied to each of the above-described illumination devices 3R and 3L. Furthermore, the optical system 4 can be applied to each of the above-described optical systems 4R and 4L.

The display panel 2 is formed into the shape of a flat plate extending in the X-Y plane. The display panel 2 comprises a first substrate SUB1, a second substrate SUB2, a liquid crystal layer LC, a first polarizer PL1, and a second polarizer PL2. The first substrate SUB1 and the second substrate SUB2 are opposed in the third direction Z. The liquid crystal layer LC is held between the first substrate SUB1 and the second substrate SUB2 and sealed by a sealant SE. The first polarizer PL1 is disposed between the illumination device 3 and the first substrate SUB1 and is, for example, attached to the first substrate SUB1. The second polarizer PL2 is disposed between the second substrate SUB2 and the optical system 4 and is, for example, attached to the second substrate SUB2.

The display panel 2 comprises a display area DA configured to emit linearly polarized display light DL. The display area DA is configured to selectively modulate illumination light from the illumination device 3. Part of the illumination light is transmitted through the second polarizer PL2 and is converted into linearly polarized display light DL.

Not only in Configuration Example 1, described here, but also in the other configuration examples, the display panel 2 is not limited to an example including a liquid crystal panel. If the display panel 2 includes a display panel comprising a self-luminous light-emitting element such as an organic EL element, the illumination device 3 is omitted as described above. In addition, in this case, display light DL emitted from the light-emitting element is transmitted through the second polarizer PL2 and converted into linearly polarized display light DL.

The optical system 4 comprises a first structure 4A and a second structure 4B. The first structure 4A is separated from the second structure 4B. In the example shown in FIG. 3, an air layer 4C is provided between the first structure 4A and the second structure 4B. The first structure 4A is disposed between the display panel 2 and the second structure 4B (or between the display panel 2 and the air layer 4C).

The first structure 4A comprises a first holographic optical element HE1 and a first retardation film R1. The first holographic optical element HE1 is opposed to the display panel 2 in the third direction Z.

The first holographic optical element HE1 and the first retardation film R1 extend over a range wider than the display area DA in the X-Y plane. The first holographic optical element HE1 and the first retardation film R1 are stacked in the third direction Z and are attached to each other. The first holographic optical element HE1 is attached to the second polarizer PL2 of the display panel 2.

The second structure 4B comprises a second holographic optical element HE2, a polarizer PL, a lens element LE, a second retardation film R2, and a third retardation film R3. The second holographic optical element HE2 is opposed to the first holographic optical element HE1 in the third direction Z. The polarizer PL is opposed to the second holographic optical element HE2 in the third direction Z. The lens element LE is opposed to the polarizer PL in the third direction Z.

The first retardation film R1 is located between the first holographic optical element HE1 and the second holographic optical element HE2 in the third direction Z. The air layer 4C is interposed between the first retardation film R1 and the second holographic optical element HE2 in the third direction Z.

The second retardation film R2 is located between the polarizer PL and the lens element LE in the third direction Z. The third retardation film R3 is located between the second holographic optical element HE2 and the polarizer PL in the third direction Z.

The second holographic optical element HE2, the third retardation film R3, the polarizer PL, the second retardation film R2, and the lens element LE extend over a range wider than the display area DA in the X-Y plane. The second holographic optical element HE2, the third retardation film R3, the polarizer PL, the second retardation film R2, and the lens element LE are stacked in the third direction Z and are attached to each other.

The first retardation film R1, the second retardation film R2, and the third retardation film R3 are quarter-wave plates, and are configured to give a quarter-wave phase difference to light transmitted through them.

The polarizer PL is configured to transmit first linearly polarized light and to absorb second linearly polarized light orthogonal to the first linearly polarized light.

The first holographic optical element HE1 and the second holographic optical element HE2 have interference fringe patterns, and have a periodic distribution of refractive indices according to wavelength in the thickness direction (third direction Z). The first holographic optical element HE1 and the second holographic optical element HE2 as described above are configured to reflect and diffract part of incident light. More specifically, the first holographic optical element HE1 comprises a virtual reflective surface RS1 and the second holographic optical element HE2 comprises a virtual reflective surface RS2. The reflective surface RS1 and the reflective surface RS2 are not parallel to each other.

The first holographic optical element HE1 is configured to reflect light incident at a first specific angle of incidence with respect to a normal of the reflective surface RS1, and to transmit light incident at an angle of incidence different from the first specific angle of incidence. Light transmitted through the first holographic optical element HE1 is light incident at an angle of incidence which is greater than or equal to the first specific angle of incidence±10°

The second holographic optical element HE2 is configured to reflect light incident at a second specific angle of incidence with respect to a normal of the reflective surface RS2, and to transmit light incident at an angle of incidence different from the second specific angle of incidence. The second specific angle of incidence is an angle different from the first specific angle of incidence. Light transmitted through the second holographic optical element HE2 is light incident at an angle of incidence which is greater than or equal to the second specific angle of incidence±10°.

The lens element LE comprises a liquid crystal layer LC1, which will be described in detail later. The liquid crystal layer LC1 is configured to give a half-wave phase difference to light of a specific wavelength and has the lens action of condensing first circularly polarized light. Note that the element having the lens action of condensing circularly polarized light is not limited to an element in which liquid crystal is used.

The display area DA comprises a first end portion E1 and a second end portion E2 on the opposite side to the first end portion E1 in the first direction X. The first holographic optical element HE1, the first retardation film R1, the second holographic optical element HE2, the third retardation film R3, the polarizer PL, the second retardation film R2, and the lens element LE comprise a first portion P11 extending more outward than the first end portion E1 and a second portion P12 extending more outward than the second end portion E2. In the example shown in FIG. 3, the first portion P11 and the second portion P12 extend in the first direction X. The width W1 in the first direction X of the first portion P11 is greater than the width W2 in the first direction X of the second portion P12 (W1>W2).

In FIG. 3, the first portion P11 is located on the right of the display area DA, and the second portion P12 is located on the left of the display area DA. In FIG. 3, display light DL is emitted from the upper left toward the lower right.

Figure 4:
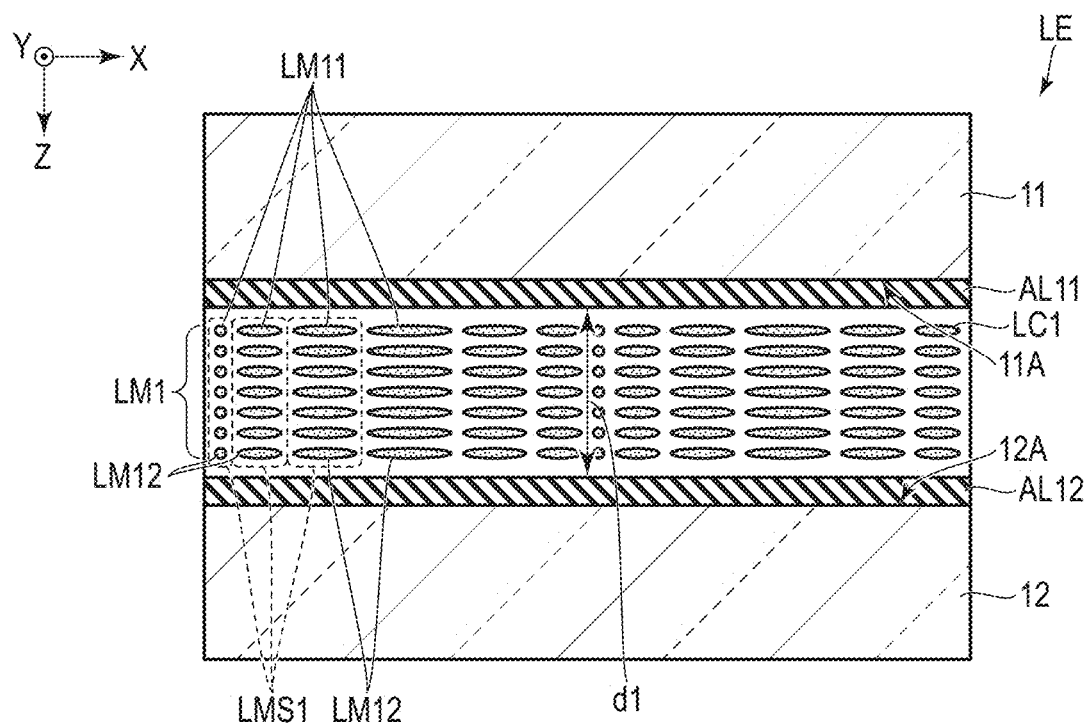
FIG. 4 is a cross-sectional view showing an example of a lens element LE shown in FIG. 3.

FIG. 4 is a cross-sectional view showing an example of the lens element LE shown in FIG. 3.

The lens element LE comprises a substrate 11, an alignment film AL11, the liquid crystal layer LC1, an alignment film AL12, and a substrate 12. The substrates 11 and 12 are transparent substrates which transmit light and are composed of, for example, transparent glass plates or transparent synthetic resin plates.

The alignment film AL11 is disposed on an inner surface 11A of the substrate 11. In the example shown in FIG. 4, the alignment film AL11 is in contact with the substrate 11, but another thin film may be interposed between the alignment film AL11 and the substrate 11.

The alignment film AL12 is disposed on an inner surface 12A of the substrate 12. In the example shown in FIG. 4, the alignment film AL12 is in contact with the substrate 12, but another thin film may be interposed between the alignment film AL12 and the substrate 12. The alignment film AL12 is opposed to the alignment film AL11 in the third direction Z.

The alignment films AL11 and AL12 are formed of, for example, polyimide, and both are horizontal alignment films having alignment restriction force along the X-Y plane.

The liquid crystal layer LC1 is disposed between alignment films AL11 and AL12 and is in contact with the alignment films AL11 and AL12. The liquid crystal layer LC1 has a thickness d1 in the third direction Z. The liquid crystal layer LC1 comprises a nematic liquid crystal in which alignment directions in the third direction Z are the same.

That is, the liquid crystal layer LC1 comprises liquid crystal structures LMS1. Each of the liquid crystal structures LMS1 comprises a liquid crystal molecule LM11 located on one end side and a liquid crystal molecule LM12 located on the other end side. The liquid crystal molecules LM11 are close to the alignment film AL11, and the liquid crystal molecules LM12 are close to the alignment film AL12. The alignment directions of the liquid crystal molecules LM11 and the alignment directions of the liquid crystal molecules LM12 are substantially identical. In addition, the alignment directions of other liquid crystal molecules LM1 between the liquid crystal molecules LM11 and the liquid crystal molecules LM12 are also substantially identical to the alignment directions of the liquid crystal molecules LM11. The alignment directions of the liquid crystal molecules LM1 here correspond to the directions of the major axes of the liquid crystal molecules in the X-Y plane.

In addition, in the liquid crystal layer LC1, the alignment directions of the liquid crystal structures LMS1 adjacent in the first direction X are different from each other. Similarly, the alignment directions of the liquid crystal structures LMS1 adjacent in the second direction Y are also different from each other. The alignment directions of the liquid crystal molecules LM11 arranged along the alignment film AL11 and the alignment directions of the liquid crystal molecules LM12 arranged along the alignment film AL12 change continuously (or linearly).

The liquid crystal layer LC1 as described above is cured in a state where the alignment directions of the liquid crystal molecules LM1 including the liquid crystal molecules LM11 and the liquid crystal molecules LM12 are fixed. That is, the alignment directions of the liquid crystal molecules LM1 are not controlled in accordance with an electric field. For this reason, the lens element LE does not comprise an electrode for alignment control.

When the refractive anisotropy or birefringence of the liquid crystal layer LC1 (difference between a refractive index ne for extraordinary light and a refractive index no for ordinary light of the liquid crystal layer LC1) is denoted by $\Delta n$, the retardation (phase difference) $\Delta n \cdot d1$ of the liquid crystal layer LC1 is set to half a specific wavelength $\lambda$.

Figure 5:
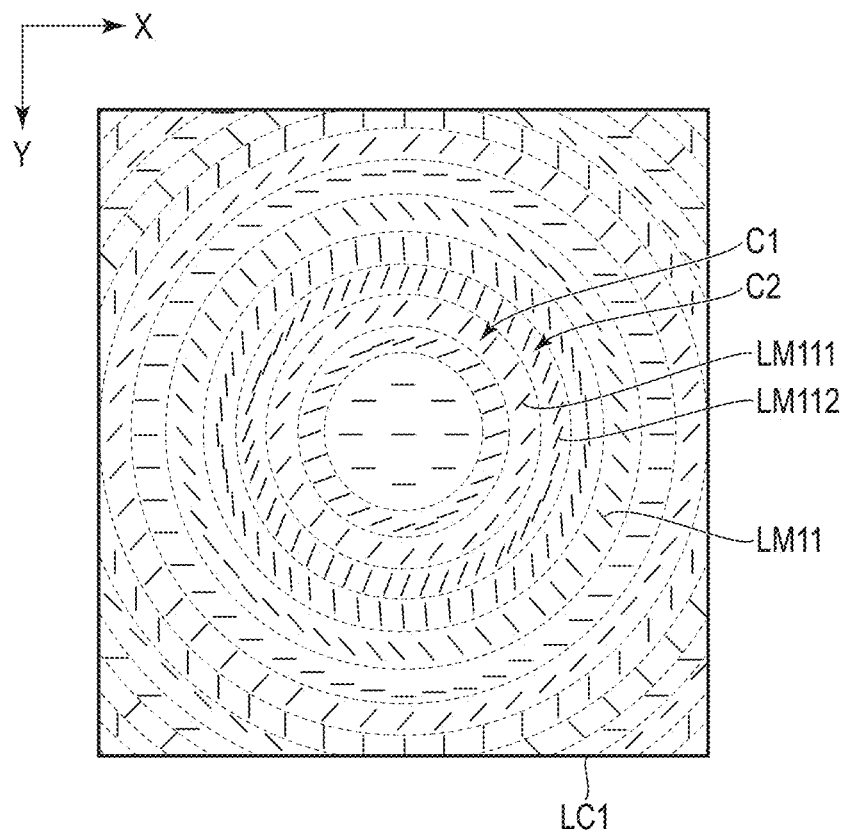
FIG. 5 is a plan view showing an example of the alignment pattern in a liquid crystal layer LC1 shown in FIG. 4.

FIG. 5 is a plan view showing an example of the alignment pattern in the liquid crystal layer LC1 shown in FIG. 4.

FIG. 5 shows an example of spatial phases in the X-Y plane of the liquid crystal layer LC1. The spatial phases here are shown as the alignment directions of the liquid crystal molecules LM11 close to the alignment film AL11, of the liquid crystal molecules LM1 included in the liquid crystal structures LMS1.

In each of the concentric circles represented by broken lines in the figure, the spatial phases are the same. Alternatively, in a circular area surrounded by adjacent two concentric circles, the alignment directions of the liquid crystal molecules LM11 are the same. Note that the alignment directions of the liquid crystal molecules LM11 of adjacent circular areas are different from each other.

For example, the liquid crystal layer LC1 comprises a first circular area C1 and a second circular area C2 in plan view. The second circular area C2 is located outside the first circular area C1. The first circular area C1 is composed of first liquid crystal molecules LM111 aligned in the same direction. In addition, the second circular area C2 is composed of second liquid crystal molecules LM112 aligned in the same direction. The alignment direction of the first liquid crystal molecules LM111 is different from the alignment direction of the second liquid crystal molecules LM112.

Similarly, the alignment directions of the liquid crystal molecules LM11 arranged in a radial direction from the central area of the concentric circles are different from each other and change continuously. That is, in the X-Y plane shown in the figure, the spatial phases of the liquid crystal layer LC1 are different in the radial direction and change continuously.

If first circularly polarized light of a specific wavelength $\lambda$ is incident on the lens element LE configured as described above, the first circularly polarized light condenses toward the center of the concentric circles, and moreover, light transmitted through the lens element LE is converted into second circularly polarized light which is polarized in the opposite direction to that of the first circularly polarized light.

Figure 6:
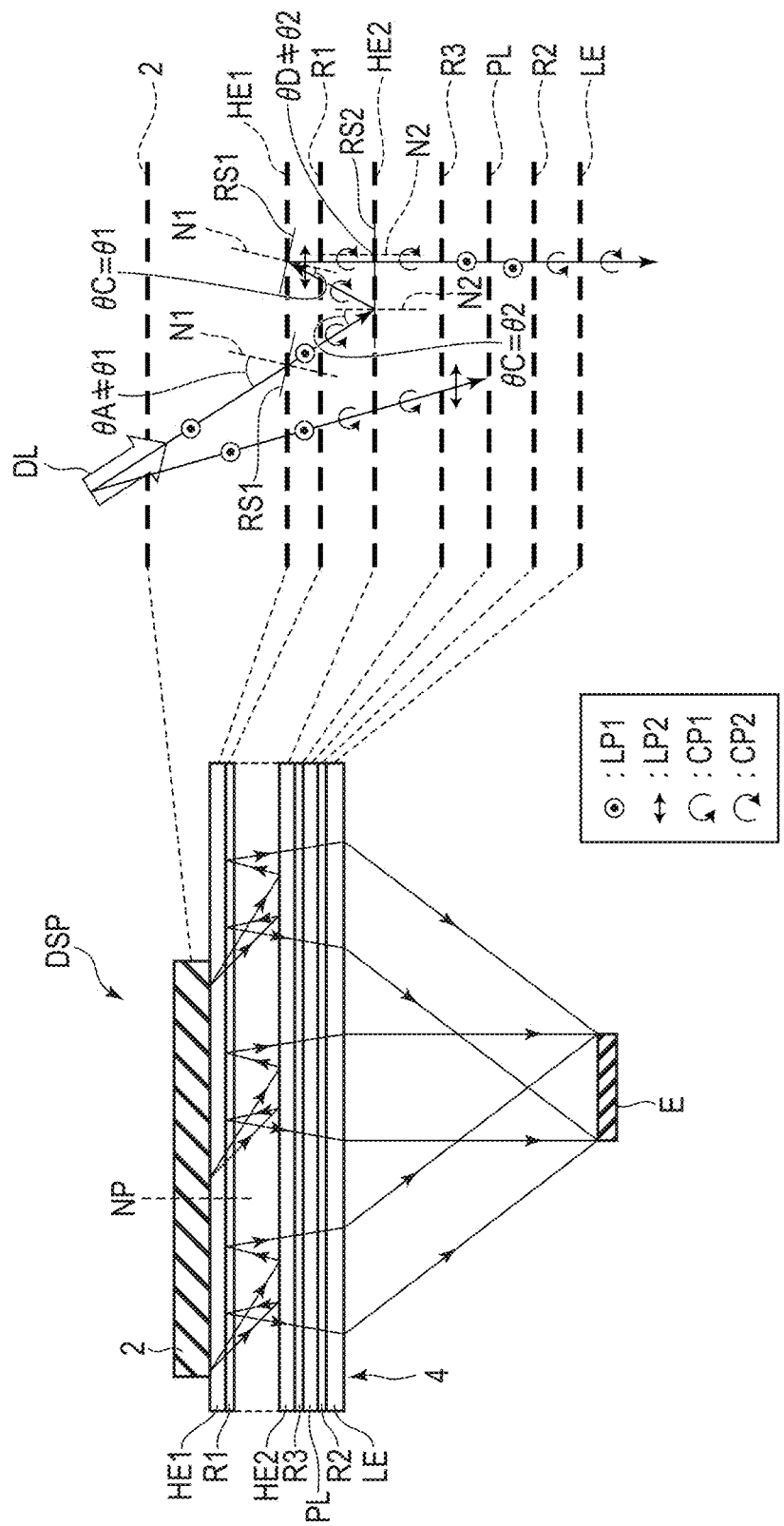
FIG. 6 is a diagram for explaining an example of the optical action of the display device DSP shown in FIG. 3.

FIG. 6 is a diagram for explaining an example of the optical action of the display device DSP shown in FIG. 3. Note that the illustration of the illumination device is omitted from the figure, and the display panel 2 is shown in a simplified manner.

First, the display panel 2 emits display light DL which is first linearly polarized light LP1. The first linearly polarized light LP1 here is, for example, linearly polarized light oscillating in a direction perpendicular to the drawing. The display light DL is emitted in an oblique direction with respect to a normal NP of the display panel 2. The display light DL is incident on the first holographic optical element HE1. The angle $\theta A$ of incidence of the first linearly polarized light LP1 incident on the first holographic optical element HE1 is different from the first specific angle $\theta 1$ of incidence in the first holographic optical element HE1. The angles of incidence here are angles formed by a normal N1 of the virtual reflective surface RS1 and incident light. Therefore, the first linearly polarized light LP1 at the angle $\theta A$ of incidence is transmitted through the first holographic optical element HE1.

The first linearly polarized light LP1 transmitted through the first holographic optical element HE1 is given a quarter-wave phase difference when being transmitted through the first retardation film R1. Thus, the first linearly polarized light LP1 is converted into first circularly polarized light CP1 when being transmitted through the first retardation film R1. The first circularly polarized light CP1 here is, for example, left-handed circularly polarized light.

The first circularly polarized light CP1 transmitted through the first retardation film R1 is incident on the second holographic optical element HE2. The angle $\theta C$ of incidence of the first circularly polarized light CP1 incident on the second holographic optical element HE2 is substantially equal to the second specific angle $\theta 2$ of incidence in the second holographic optical element HE2. The angles of incidence here are angles formed by a normal N2 of the virtual reflective surface RS2 and incident light. The first circularly polarized light CP1 at the angle $\theta C$ of incidence is reflected at the reflective surface RS2 of the second holographic optical element HE2 toward the first holographic optical element HE1. Light reflected at the reflective surface RS2 is second circularly polarized light CP2 which is polarized in the opposite direction to that of the first circularly polarized light CP1.

The second circularly polarized light CP2 reflected at the second holographic optical element HE2 is converted into second linearly polarized light LP2 when being transmitted through the first retardation film R1. The second linearly polarized light LP2 here is, for example, linearly polarized light oscillating in a direction parallel to the drawing. The second linearly polarized light LP2 transmitted through the first retardation film R1 is incident on the first holographic optical element HE1. The angle $\theta B$ of incidence of the second linearly polarized light LP2 incident on the first holographic optical element HE1 is substantially equal to the first specific angle θ1 of incidence in the first holographic optical element HE1. Thus, the second linearly polarized light LP2 at the angle θB of incidence is reflected at the reflective surface RS1 of the first holographic optical element HE1 toward the second holographic optical element HE2.

The second linearly polarized light LP2 reflected at the first holographic optical element HE1 is converted into second circularly polarized light CP2 when being transmitted through the first retardation film R1. The second circularly polarized light CP2 transmitted through the first retardation film R1 is incident on the second holographic optical element HE2. The angle θD of incidence of the second circularly polarized light CP2 incident on the second holographic optical element HE2 is different from the second specific angle θ2 of incidence in the second holographic optical element HE2. Therefore, the second circularly polarized light CP2 at the angle θD of incidence is transmitted through the second holographic optical element HE2.

The second circularly polarized light CP2 transmitted through the second holographic optical element HE2 is converted into first linearly polarized light LP1 when being transmitted through the third retardation film R3. The first linearly polarized light LP1 transmitted through the third retardation film R3 is transmitted through the polarizer PL. The first linearly polarized light LP1 transmitted through the polarizer PL is converted into first circularly polarized light CP1 when being transmitted through the second retardation film R2. The first circularly polarized light CP1 transmitted through the second retardation film R2 is converted into second circularly polarized light CP2 and condensed on the user's eye E by the lens action in the lens element LE.

In the display device DSP as described above, the optical system 4 comprises an optical path which passes between the first holographic optical element HE1 and the second holographic optical element HE2 three times. Moreover, the optical path includes an oblique optical path from the first holographic optical element HE1 to the second holographic optical element HE2 and an oblique optical path from the second holographic optical element HE2 to the first holographic optical element HE1. That is, in the optical system 4, the optical distance between the first holographic optical element HE1 and the second holographic optical element HE2 is greater than or equal to three times the actual distance between the first holographic optical element HE1 and the second holographic optical element HE2 (or the thickness of the air layer 4C). The display panel 2 is placed inside the focal point of the lens element LE having the lens action. The user thereby can observe a magnified virtual image.

To realize the optical path which passes between the first holographic optical element HE1 and the second holographic optical element HE2 three times, it is important that display light DL be emitted from the display panel 2 at such an angle that it is transmitted through the first holographic optical element HE1 and reflected by the second holographic optical element HE2.

If part of the display light DL is emitted from the display panel 2 at such an angle that it is transmitted through the first holographic optical element HE1 and the second holographic optical element HE2, it is observed by the user at a magnification different from that of light passing through the regular optical path and can be a cause for a multiple image (so-called ghost).

In contrast, in Configuration Example 1, light transmitted through the first holographic optical element HE1 and the second holographic optical element HE2 is absorbed by the polarizer PL. That is, first linearly polarized light LP1 transmitted through the first holographic optical element HE1 is converted into first circularly polarized light CP1 when being transmitted through the first retardation film R1. The first circularly polarized light CP1 is transmitted through the second holographic optical element HE2, is converted into second linearly polarized light when being transmitted through the third retardation film R3, and is absorbed by the polarizer PL. Note that light passing through the regular optical path is converted into first linearly polarized light LP1 when being transmitted through the third retardation film R3, and is transmitted through the polarizer PL. Accordingly, undesirable light is not observed by the user and the degradation in display quality can be suppressed.

In addition, if absorption by each member constituting the display device DSP and reflection between each member are ignored, substantially 100% of the display light DL emitted from the display panel 2 can be condensed on the eye E, and the efficiency of light utilization can be improved.

Moreover, compared to that of an optical system comprising optical components formed of glass, resin, etc., the thickness in the third direction Z can be reduced, and further, weight reduction can be achieved.

Note that the first linearly polarized light LP1 described with reference to FIG. 6 may be replaced by the second linearly polarized light LP2, or the first circularly polarized light CP1 may be replaced by the second circularly polarized light CP2.

Figure 7:
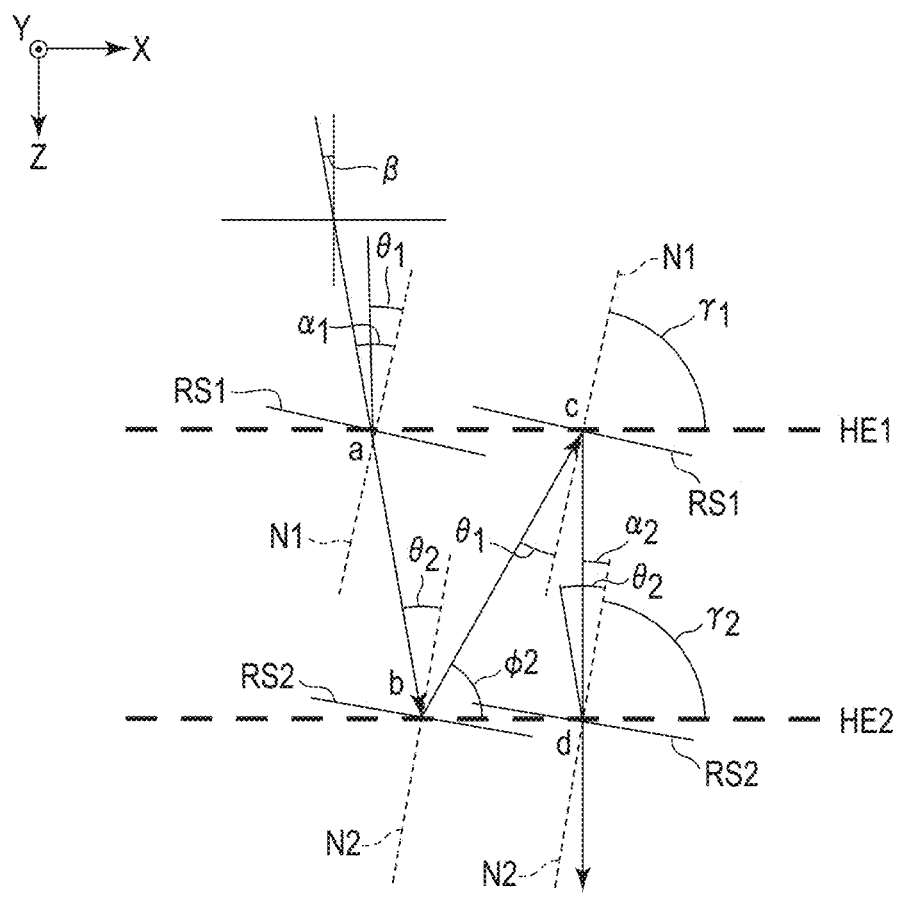
FIG. 7 is a diagram for explaining a first specific angle θ1 of incidence of a first holographic optical element HE1 and a second specific angle θ2 of incidence of a second holographic optical element HE2 shown in FIG. 6.

FIG. 7 is a diagram for explaining the first specific angle θ1 of incidence of the first holographic optical element HE1 and the second specific angle θ2 of incidence of the second holographic optical element HE2 shown in FIG. 6.

In the first holographic optical element HE1, the angle formed by the normal N1 of the reflective surface RS1 and a reference plane (X-Y plane) is denoted by γ1, and the angle formed by light incident at an angle β of incidence and the normal N1 is denoted by α1.

In the second holographic optical element HE2, the angle formed by the normal N2 of the reflective surface RS2 and a reference plane (X-Y plane) is denoted by γ2, the angle formed by light reflected by the reflective surface RS2 and the reference plane is denoted by φ2, and the angle formed by light reflected by the reflective surface RS1 and the normal N2 is denoted by α2.

As indicated by c in the figure, the following equation is derived from the condition on which light at the first specific angle θ1 of incidence is reflected at the reflective surface RS1:

$$\gamma1 = \pi/2 - \theta1.$$

As indicated by b in the figure, the following equation is derived from the condition on which light at the second specific angle θ2 of incidence is reflected by the reflective surface RS2:

$$\gamma2 = \theta2 - 2\cdot\theta1 + \pi/2.$$

As indicated by a in the figure, the condition for transmission through the first holographic optical element HE1 is as follows:

$$\delta1 = \alpha1 - \theta1 \neq 0.$$

In this equation, the following relations hold:

$$\alpha1 = 2\cdot\theta2 + \phi2 - \gamma1 \text{ and } \phi2 = \pi/2 - 2\cdot\theta1.$$

For δ1, the following equation is derived from these relations:

$$\delta1=2\cdot(\theta1-\theta2)\neq 0.$$

Accordingly, θ1≠θ2.

As indicated by d in the figure, the condition for transmission through the second holographic optical element HE2 is as follows:

$$\delta2=\alpha2-\theta2\neq 0.$$

In this equation, the following relation holds:

$$\alpha2=\pi/2-\Gamma2.$$

For δ2, the following equation is derived.

$$\delta2=2\cdot(\theta1-\theta2)\neq 0$$

Accordingly, θ1≠θ2.

That is, since the first specific angle θ1 of incidence is different from the second specific angle θ2 of incidence, the optical system 4 of Configuration Example 1 is realized. In addition, as the difference between the first specific angle θ1 of incidence and the second specific angle θ2 of incidence becomes greater, the condition for transmission through the first holographic optical element HE1 and the second holographic optical element HE2 is loosened more, which is preferable.

At this time, the angle β of incidence is as follows:

$$\beta=\alpha1+\gamma1-\pi/2=2\cdot(\theta2-\theta1).$$

Figure 8:
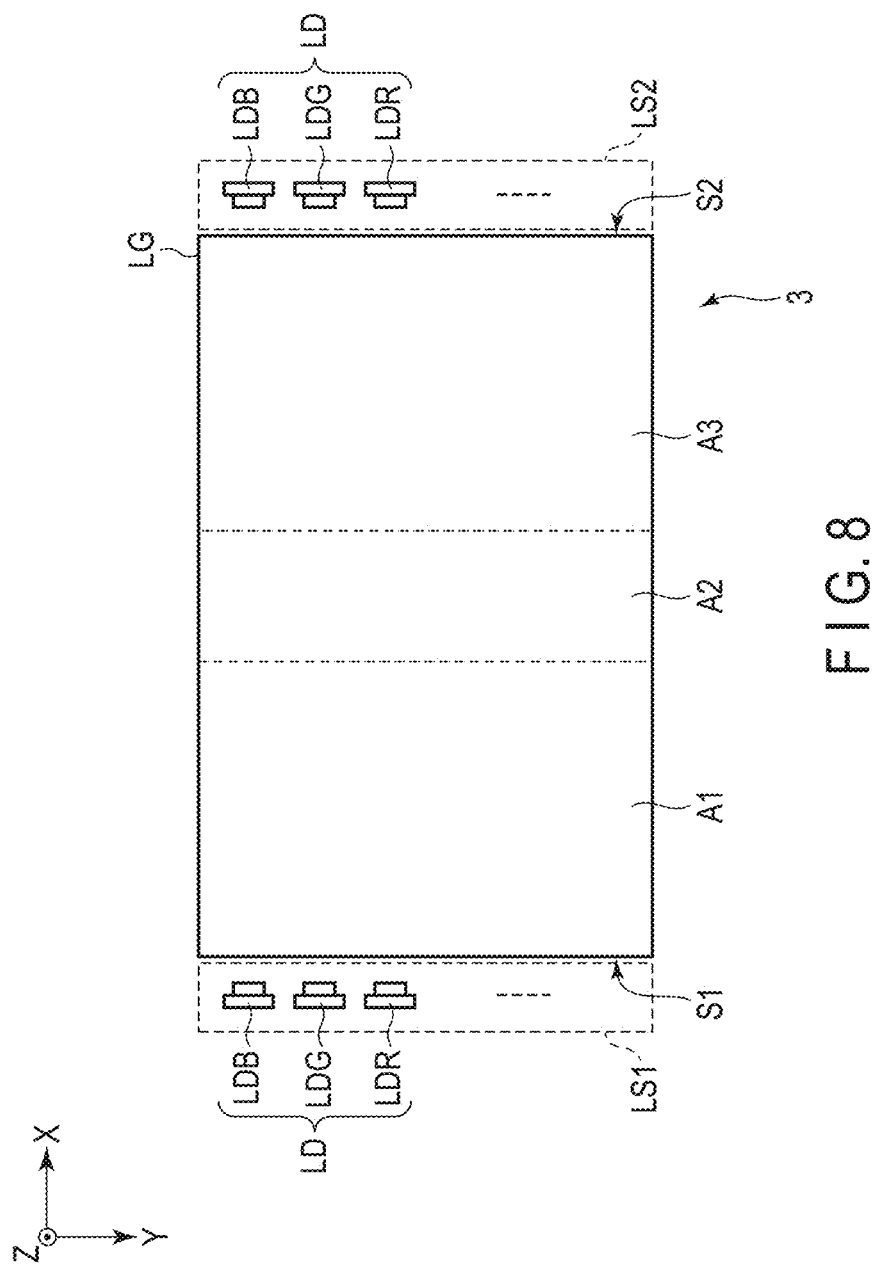
FIG. 8 is a plan view showing a configuration example of an illumination device 3 which can be applied to the display device DSP shown in FIG. 3.

FIG. 8 is a plan view showing a configuration example of the illumination device 3 which can be applied to the display device DSP shown in FIG. 3. Note that FIG. 8 shows only the main portions of the illumination device 3.

The illumination device 3 comprises a light guide LG, a first light source portion LS1, and a second light source portion LS2.

The light guide LG comprises a side surface S1 and a side surface S2. The side surface S1 and the side surface S2 are opposed in the first direction X. In addition, the light guide LG comprises an area A1, an area A2, and an area A3. The thickness in the third direction Z of the area A2 is substantially constant. The thickness of the area A1 increases gradually from the side surface S1 toward the area A2. The thickness of the area A3 increases gradually from the side surface S2 toward the area A2.

The first light source portion LS1 is disposed along the side surface S1. The second light source portion LS2 is disposed along the side surface S2. Each of the first light source portion LS1 and the second light source portion LS2 comprises light-emitting elements LD. That is, the first light source portion LS1 and the second light source portion LS2 each comprise a first light-emitting element LDB configured to emit light of a blue wavelength (first wavelength), a second light-emitting element LDG configured to emit light of a green wavelength (second wavelength), and a third light-emitting element LDR configured to emit light of a red wavelength (third wavelength) as the light-emitting elements LD. The first light-emitting elements LDB, the second light-emitting elements LDG, and the third light-emitting elements LDR are arranged at intervals.

It is preferable that light emitted from the light-emitting elements LD have a narrow spectral width (or high color purity). It is therefore preferable that laser elements be applied as the light-emitting elements LD. Let λb denote a center wavelength of a blue laser beam emitted from the first light-emitting elements (first laser elements) LDB, let λg denote a center wavelength of a green laser beam emitted from the second light-emitting elements (second laser elements) LDG, and let λr denote a center wavelength of a red laser beam emitted from the third light-emitting elements (third laser elements) LDR.

The illumination device 3 as described above is configured to illuminate the display panel 2 such that the angle of incidence of display light DL emitted from the display panel 2 with respect to the first holographic optical element HE1 satisfies the relation of the angle β of incidence described with reference to FIG. 7.

Figure 9:
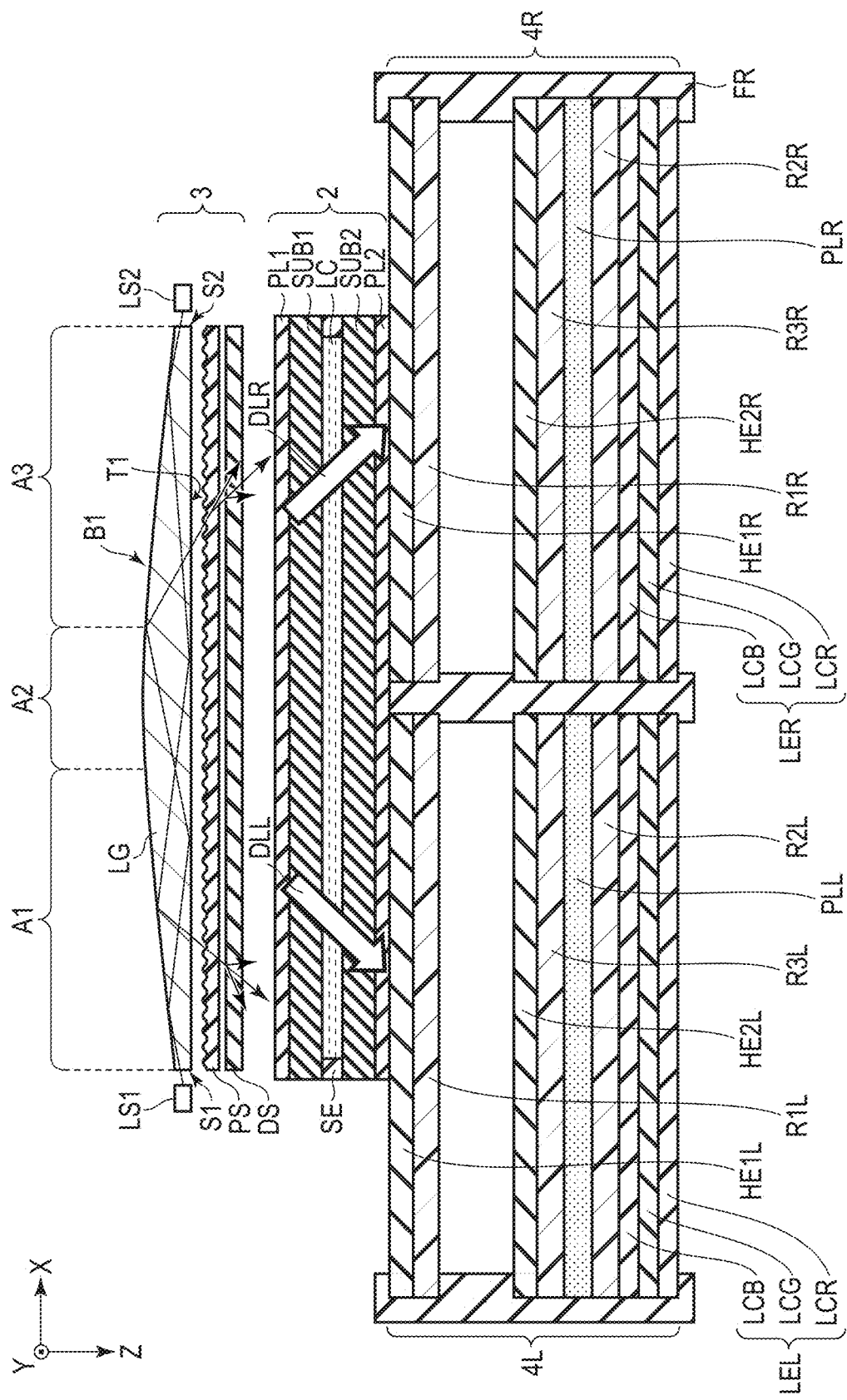
FIG. 9 is a cross-sectional view showing a configuration example of the head-mounted display 1.

FIG. 9 is a cross-sectional view showing a configuration example of the head-mounted display 1.

The head-mounted display 1 comprises the single display panel 2, the single illumination device 3 shown in FIG. 8, the optical systems 4R and 4L, a frame FR. The display panel 2 functions as the display panel 2R for the right eye and the display panel 2L for the left eye shown in FIG. 2. The illumination device 3 functions as the illumination device 3R for the right eye and the illumination device 3L for the left eye.

The illumination device 3 comprises the first light source portion LS1 and the second light source portion LS2, the light guide LG, a prism sheet PS, and a diffusion sheet DS. The prism sheet PS is disposed between the light guide LG and the diffusion sheet DS in the third direction Z. The diffusion sheet DS is disposed between the prism sheet PS and the display panel 2 in the third direction Z.

The first light source portion LS1 mainly emits light guided to the optical system 4R while located on the left side in the figure. The second light source portion LS2 mainly emits light guided to the optical system 4L while located on the right side in the figure. Each of the first light source portion LS1 and the second light source portion LS2 comprises the first light-emitting element LDB, the second light-emitting element LDG, and the third light-emitting element LDR as described with reference to FIG. 8.

The display panel 2 comprises the first substrate SUB1, the second substrate SUB2, the liquid crystal layer LC, the first polarizer PL1, and the second polarizer PL2. The liquid crystal layer LC is held between the first substrate SUB1 and the second substrate SUB2 and sealed by the sealant SE. The first polarizer PL1 is disposed between the illumination device 3 and the first substrate SUB1. The second polarizer PL2 is disposed between the second substrate SUB2 and the optical systems 4R and 4L.

The optical system 4L comprises a first holographic optical element HE1L, a first retardation film R1L, a second holographic optical element HE2L, a third retardation film R3L, a polarizer PLL, a second retardation film R2L, and a lens element LEL.

The optical system 4R comprises a first holographic optical element HE1R, a first retardation film R1R, a second holographic optical element HE2R, a third retardation film R3R, a polarizer PLR, a second retardation film R2R, and a lens element LER.

Each of the first holographic optical elements HE1L and HE1R is configured to reflect light of the blue wavelength (first wavelength) λb at the first specific angle θ1 of incidence, light of the green wavelength (second wavelength) λg at the first specific angle θ1 of incidence, and light of the red wavelength (third wavelength) λr at the first specific angle θ1 of incidence, at the reflective surface RS1.

Each of the second holographic optical elements HE2L and HE2R is configured to reflect light of the blue wavelength (first wavelength) λb at the second specific angle θ2 of incidence, light of the green wavelength (second wavelength) λg at the second specific angle θ2 of incidence, and light of the red wavelength (third wavelength) λr at the second specific angle θ2 of incidence, at the reflective surface RS2.

Each of the lens elements LEL and LER comprises a first liquid crystal layer LCB, a second liquid crystal layer LCG, and a third liquid crystal layer LCR. The first liquid crystal layer LCB, the second liquid crystal layer LCG, and the third liquid crystal layer LCR are stacked in the third direction Z. Note that the order in which the first liquid crystal layer LCB, the second liquid crystal layer LCG, and the third liquid crystal layer LCR are stacked is not limited to the example shown in the figure.

Each of the first liquid crystal layer LCB, the second liquid crystal layer LCG, and the third liquid crystal layer LCR corresponds to the liquid crystal layer LC1 described with reference to FIG. 4 and FIG. 5, and is cured in a state where the alignment directions of liquid crystal molecules are fixed.

The first liquid crystal layer LCB is configured to condense first circularly polarized light of the blue wavelength (first wavelength) λb of the incident light and to give a half-wave phase difference. The second liquid crystal layer LCG is configured to condense first circularly polarized light of the green wavelength (second wavelength) λg of the incident light and to give a half-wave phase difference. The third liquid crystal layer LCR is configured to condense first circularly polarized light of the red wavelength (third wavelength) λr of the incident light and to give a half-wave phase difference.

The optical systems 4R and 4L having the above-described configuration each exerts the optical action described with reference to FIG. 6.

In the above-described head-mounted display 1, the first light source portion LS1 of the illumination device 3 radiates light toward the side surface S1, and the second light source portion LS2 radiates light toward the side surface S2. Light incident from the side surface S1 and light incident from the side surface S2 are propagated while being reflected repeatedly between a top surface T1 and a bottom surface B1 of the light guide LG. In addition, of the light incident from the side surface S1, light which does not satisfy the condition for total reflection on the top surface T1 is emitted in an oblique direction toward the optical system 4R and forms illumination light for the right eye. Of the light incident from the side surface S2, light which does not satisfy the condition for total reflection on the top surface T1 is emitted in an oblique direction toward the optical system 4L and forms illumination light for the left eye.

The display panel 2 selectively modulates illumination light from the illumination device 3. Part of the illumination light for the left eye is transmitted through the second polarizer PL2 and converted into display light DLL which is linearly polarized light for the left eye. Part of the illumination light for the right eye is transmitted through the second polarizer PL2 and converted into display light DLR which is linearly polarized light for the right eye.

The display light DLL is condensed on the user's left eye by the optical action of the above-described optical system 4L. The display light DLR is condensed on the user's right eye by the optical action of the above-described optical system 4R.

In the head-mounted display 1 as described above, the illumination device 3 comprises laser elements which emit light of a narrow spectral width, and the first holographic optical element HE1, the second holographic optical element HE2, and the lens element LE are optimized in accordance with the center wavelength of light emitted from the laser elements. Accordingly, light of each wavelength can be condensed efficiently and chromatic aberration can be reduced, enabling the user to visually recognize a vivid image.

Other configuration examples of the display device DSP will be described next. In the following description, the same structures as those of Configuration Example 1 are denoted by the same reference numerals and a description thereof may be omitted.

CONFIGURATION EXAMPLE 2

Figure 10:
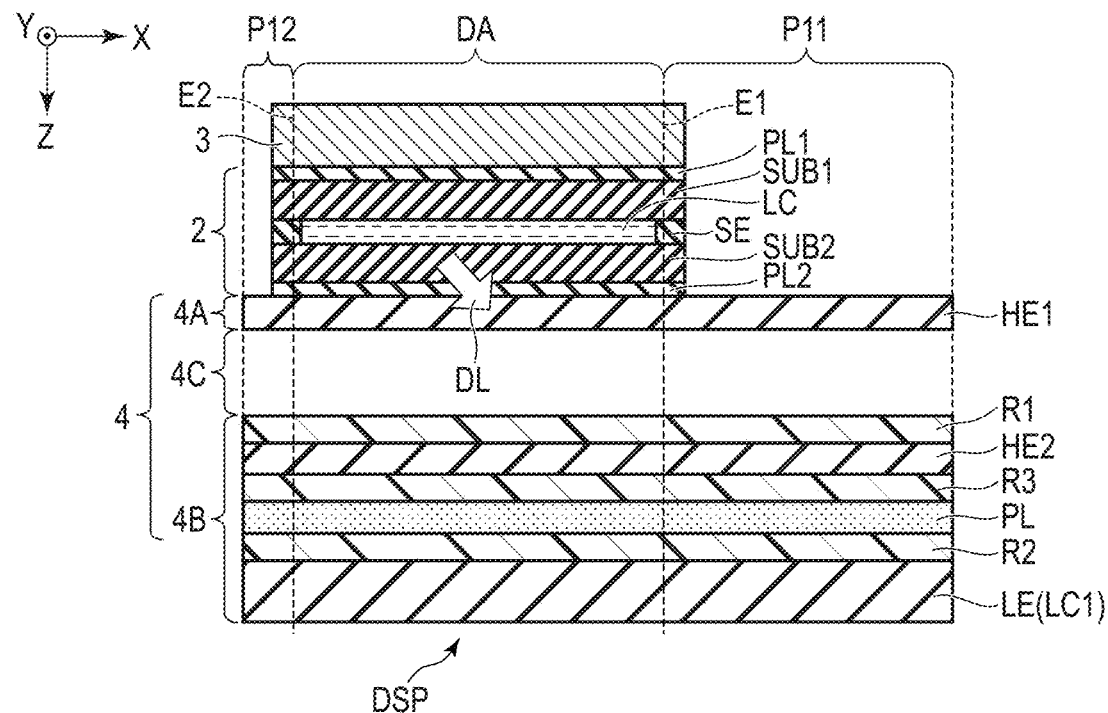
FIG. 10 is a cross-sectional view showing Configuration Example 2 of the display device DSP.

FIG. 10 is a cross-sectional view showing Configuration Example 2 of the display device DSP.

Configuration Example 2 shown in FIG. 10 is different from Configuration Example 1 shown in FIG. 3 in that the first retardation film R1 constitutes the second structure 4B and the air layer 4C is interposed between the first holographic optical element HE1 and the first retardation film R1.

The first structure 4A is constituted of the first holographic optical element HE1. The first holographic optical element HE1 is attached to the second polarizer PL2 of the display panel 2.

The second structure 4B comprises the first retardation film R1, the second holographic optical element HE2, the second retardation film R2, the polarizer PL, the third retardation film R3, and the lens element LE. The first retardation film R1, the second holographic optical element HE2, the third retardation film R3, the polarizer PL, the second retardation film R2, and the lens element LE are stacked in the third direction Z and are attached to each other.

In Configuration Example 2, too, the same advantages as those of Configuration Example 1, described above, can be achieved.

CONFIGURATION EXAMPLE 3

Figure 11:
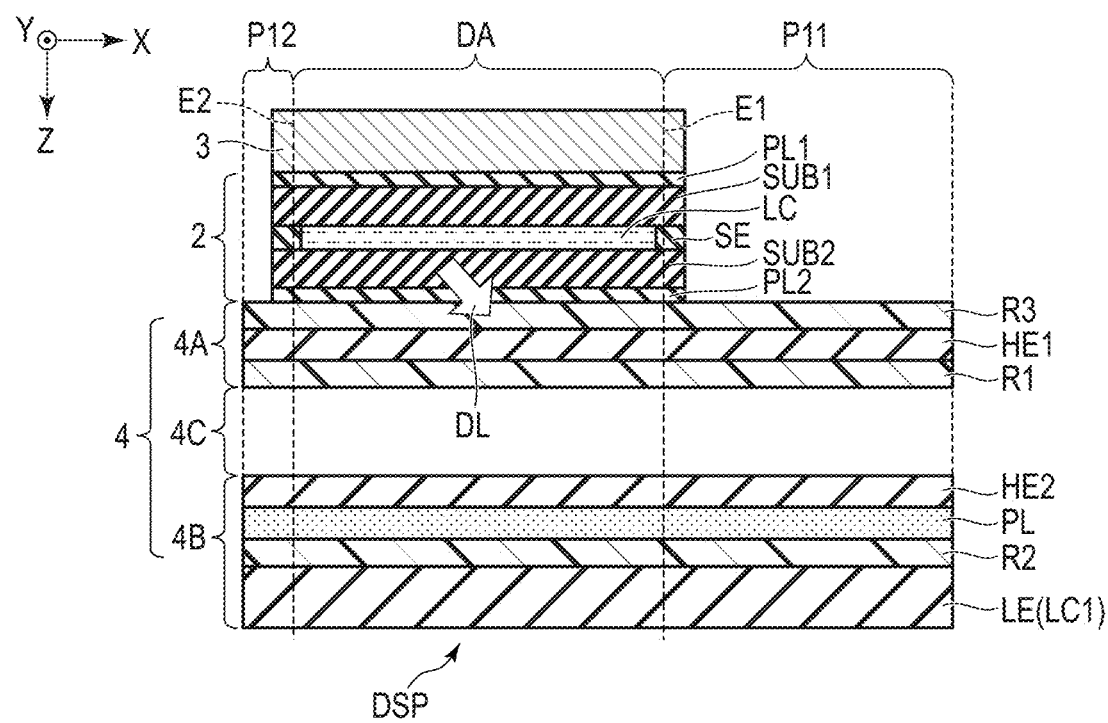
FIG. 11 is a cross-sectional view showing Configuration Example 3 of the display device DSP.

FIG. 11 is a cross-sectional view showing Configuration Example 3 of the display device DSP.

Configuration Example 3 shown in FIG. 11 is different from Configuration Example 1 shown in FIG. 3 in that the third retardation film R3 is located between the display panel 2 and the first holographic optical element HE1.

The first structure 4A comprises the first holographic optical element HE1, the first retardation film R1, and the third retardation film R3. The third retardation film R3, the first holographic optical element HE1, and the first retardation film R1 are stacked in the third direction Z and are attached to each other. The third retardation film R3 is attached to the second polarizer PL2 of the display panel 2.

The second structure 4B comprises the second holographic optical element HE2, the polarizer PL, the second retardation film R2, and the lens element LE. The air layer 4C is interposed between the first retardation film R1 and the second holographic optical element HE2 in the third direction Z. The second holographic optical element HE2, the polarizer PL, the second retardation film R2, and the lens element LE are stacked in the third direction Z and are attached to each other.

In Configuration Example 3, too, the same advantages as those of Configuration Example 1, described above, can be achieved.

CONFIGURATION EXAMPLE 4

Figure 12:
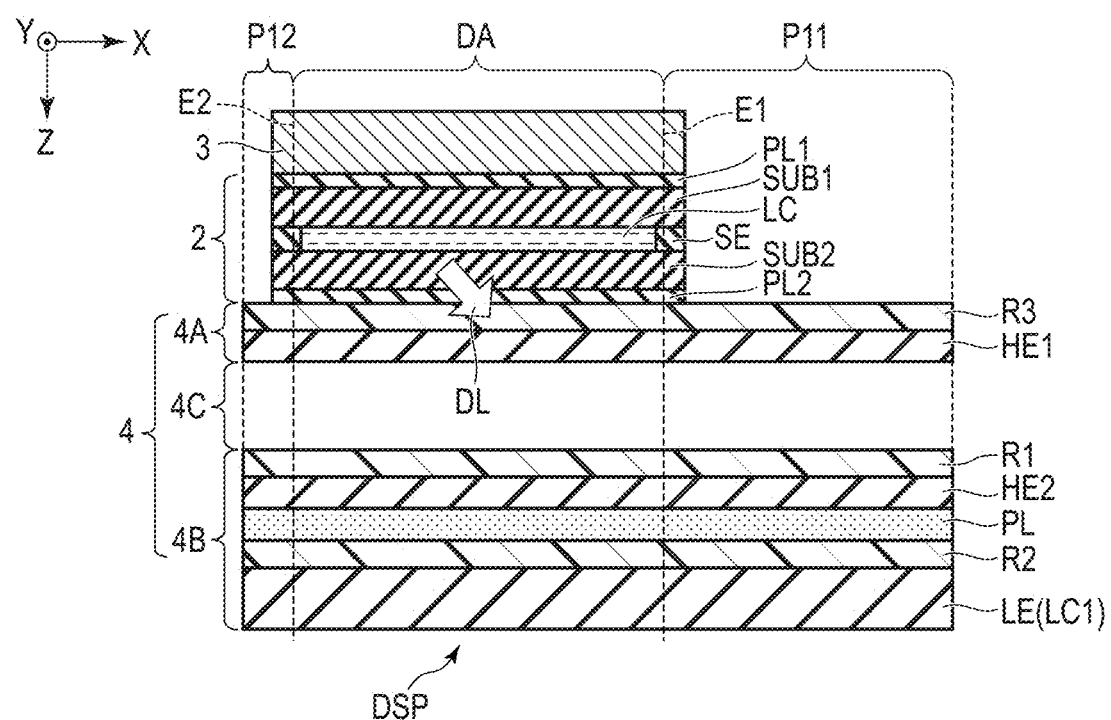
FIG. 12 is a cross-sectional view showing Configuration Example 4 of the display device DSP.

FIG. 12 is a cross-sectional view showing Configuration Example 4 of the display device DSP.

Configuration Example 4 shown in FIG. 12 is different from Configuration Example 3 shown in FIG. 11 in that the first retardation film R1 constitutes the second structure 4B and the air layer 4C is interposed between the first holographic optical element HE1 and the first retardation film R1.

The first structure 4A comprises the first holographic optical element HE1 and the third retardation film R3. The third retardation film R3 and the first holographic optical element HE1 are stacked in the third direction Z and are attached to each other. The third retardation film R3 is attached to the second polarizer PL2 of the display panel 2.

The second structure 4B comprises the first retardation film R1, the second retardation film R2, the second holographic optical element HE2, the polarizer PL, and the lens element LE. The first retardation film R1, the second holographic optical element HE2, the polarizer PL, the second retardation film R2, and the lens element LE are stacked in the third direction Z and are attached to each other.

In Configuration Example 4, too, the same advantages as those of Configuration Example 1, described above, can be achieved.

The optical system 4 described in Configuration Examples 2 to 4, described above, also can be applied to the head-mounted display 1 described with reference to FIG. 9.

As described above, according to the present embodiment, a display device which can suppress degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel configured to emit linearly polarized display light;
a first holographic optical element opposed to the display panel;
a second holographic optical element opposed to the first holographic optical element;
a polarizer opposed to the second holographic optical element, transmitting first linearly polarized light, and absorbing second linearly polarized light orthogonal to the first linearly polarized light;
a lens element opposed to the polarizer and having a lens action of condensing first circularly polarized light of light transmitted through the second holographic optical element;
a first retardation film located between the first holographic optical element and the second holographic optical element;
a second retardation film located between the polarizer and the lens element; and
a third retardation film located between the second holographic optical element and the polarizer.

2. The display device of claim 1, wherein
the first holographic optical element and the first retardation film are stacked, and
an air layer is interposed between the first retardation film and the second holographic optical element.

3. The display device of claim 2, wherein
the second holographic optical element, the third retardation film, the polarizer, the second retardation film, and the lens element are stacked.

4. The display device of claim 1, wherein
the first retardation film, the second holographic optical element, the third retardation film, the polarizer, the second retardation film, and the lens element are stacked, and
an air layer is interposed between the first holographic optical element and the first retardation film.

5. A display device comprising:
a display panel configured to emit linearly polarized display light;
a first holographic optical element opposed to the display panel;
a second holographic optical element opposed to the first holographic optical element;
a polarizer opposed to the second holographic optical element, transmitting first linearly polarized light, and absorbing second linearly polarized light orthogonal to the first linearly polarized light;
a lens element opposed to the polarizer and having a lens action of condensing first circularly polarized light of light transmitted through the second holographic optical element;
a first retardation film located between the first holographic optical element and the second holographic optical element;
a second retardation film located between the polarizer and the lens element; and
a third retardation film located between the display panel and the first holographic optical element.

6. The display device of claim 5, wherein
the third retardation film, the first holographic optical element, and the first retardation film are stacked, and
an air layer is interposed between the first retardation film and the second holographic optical element.

7. The display device of claim 6, wherein
the second holographic optical element, the polarizer, the second retardation film, and the lens element are stacked.

8. The display device of claim 5, wherein
the third retardation film and the first holographic optical element are stacked, and
an air layer is interposed between the first retardation film and the first holographic optical element.

9. The display device of claim 8, wherein
the first retardation film, the second holographic optical element, the polarizer, the second retardation film, and the lens element are stacked.

10. The display device of claim 1, wherein
the first retardation film, the second retardation film, and the third retardation film are quarter-wave plates.

11. The display device of claim 1, wherein
the first holographic optical element reflects light at a first specific angle of incidence and transmits light at an angle of incidence different from the first specific angle of incidence, and
the second holographic optical element reflects light at a second specific angle of incidence different from the first specific angle of incidence and transmits light at an angle of incidence different from the second specific angle of incidence.

12. The display device of claim 11, wherein $$\beta = 2 \cdot (\theta 2 - \theta 1),$$

where β is an angle of incidence of the display light on the first holographic optical element, θ1 is the first specific angle of incidence, and θ2 is the second specific angle of incidence.

13. The display device of claim 12, further comprising an illumination device disposed on a back surface of the display panel, wherein
the illumination device comprises a first light-emitting element configured to emit light of a first wavelength, a second light-emitting element configured to emit light of a second wavelength different from the first wavelength, and a third light-emitting element configured to emit light of a third wavelength different from the first wavelength and the second wavelength, and is configured to form light at the angle β of incidence.

14. The display device of claim 13, wherein each of the first light-emitting element, the second light-emitting element, and the third light-emitting element is a laser element.

15. The display device of claim 13, wherein
the lens element comprises a first liquid crystal layer, a second liquid crystal layer overlapping the first liquid crystal layer, and a third liquid crystal layer overlapping the second liquid crystal layer,
each of the first liquid crystal layer, the second liquid crystal layer, and the third liquid crystal layer is cured in a state where alignment directions of liquid crystal molecules are fixed,
the first liquid crystal layer condenses the first circularly polarized light of the first wavelength,
the second liquid crystal layer condenses the first circularly polarized light of the second wavelength, and
the third liquid crystal layer condenses the first circularly polarized light of the third wavelength.

16. The display device of claim 15, wherein
each of the first liquid crystal layer, the second liquid crystal layer, and the third liquid crystal layer comprises, in plan view, a first circular area where first liquid crystal molecules are aligned in the same direction and a second circular area where second liquid crystal molecules are aligned in the same direction, the second circular area being outside the first circular area, and
the alignment direction of the first liquid crystal molecules is different from the alignment direction of the second liquid crystal molecules.

17. The display device of claim 5, wherein
the first holographic optical element reflects light at a first specific angle of incidence and transmits light at an angle of incidence different from the first specific angle of incidence, and
the second holographic optical element reflects light at a second specific angle of incidence different from the first specific angle of incidence and transmits light at an angle of incidence different from the second specific angle of incidence.

18. The display device of claim 17, wherein $$\beta = 2 \cdot (\theta 2 - \theta 1),$$

where β is an angle of incidence of the display light on the first holographic optical element, θ1 is the first specific angle of incidence, and θ2 is the second specific angle of incidence.

19. The display device of claim 18, further comprising an illumination device disposed on a back surface of the display panel, wherein
the illumination device comprises a first light-emitting element configured to emit light of a first wavelength, a second light-emitting element configured to emit light of a second wavelength different from the first wavelength, and a third light-emitting element configured to emit light of a third wavelength different from the first wavelength and the second wavelength, and is configured to form light at the angle β of incidence.

20. The display device of claim 19, wherein
each of the first light-emitting element, the second light-emitting element, and the third light-emitting element is a laser element.

* * * * *